United States Patent
Hammersmith et al.

(10) Patent No.: US 6,305,678 B1
(45) Date of Patent: Oct. 23, 2001

(54) WELDER POSITIONER

(75) Inventors: Dennis L. Hammersmith, Horton; Brett Ware, Denton, both of KS (US)

(73) Assignee: Hammersmith Mfg. & Sales, Inc., Horton, KS (US)

(*) Notice: Subject to any disclaimer, the term of this patent is extended or adjusted under 35 U.S.C. 154(b) by 0 days.

(21) Appl. No.: 09/586,230

(22) Filed: Jun. 2, 2000

(51) Int. Cl.⁷ ....................................... B23Q 1/25
(52) U.S. Cl. ............................. 269/71; 269/73
(58) Field of Search .................. 269/17, 71, 73, 269/133 R, 134, 55, 56

(56) References Cited

U.S. PATENT DOCUMENTS

| | | |
|---|---|---|
| 1,440,888 | 1/1923 | O'Donnell . |
| 2,523,880 | 9/1950 | Schoenfielder . |
| 3,430,970 | 3/1969 | Gannon . |
| 3,457,889 | 7/1969 | Kelch et al. . |
| 3,521,875 | 7/1970 | Kapelsohn . |
| 3,814,413 | 6/1974 | Bopp . |
| 3,868,101 | 2/1975 | Nozaki et al. . |
| 3,917,249 | 11/1975 | Constantine . |
| 4,029,308 * | 6/1977 | Mathers ................................ 269/71 |
| 4,090,625 * | 5/1978 | Walters ................................ 269/71 |
| 4,202,539 | 5/1980 | Polastri et al. . |
| 4,531,720 | 7/1985 | Soder . |
| 4,533,128 | 8/1985 | Guigon . |
| 4,568,070 | 2/1986 | Severt . |
| 4,653,739 | 3/1987 | Moore . |
| 4,762,459 | 8/1988 | Morita et al. . |
| 4,767,109 | 8/1988 | Raketich . |
| 4,769,888 | 9/1988 | Desiro . |
| 4,828,451 | 5/1989 | Mikoshi et al. . |
| 4,866,925 | 9/1989 | Stahlecker et al. . |
| 4,962,917 | 10/1990 | Tamura et al. . |
| 5,085,557 | 2/1992 | Koltookian . |
| 5,235,886 | 8/1993 | Jurus . |
| 5,259,722 | 11/1993 | Inoue et al. . |
| 5,282,714 | 2/1994 | Diebolt . |
| 5,313,986 | 5/1994 | Jude . |
| 5,690,323 | 11/1997 | Puttmer et al. . |
| 5,944,896 * | 8/1999 | Landesman et al. .................. 269/71 |

* cited by examiner

Primary Examiner—Joseph J. Hail, III
Assistant Examiner—Lee Wilson
(74) Attorney, Agent, or Firm—Shook, Hardy & Bacon LLP

(57) ABSTRACT

An apparatus for positioning a workpiece in a desired orientation for welding or the like during a manufacturing process is provided. The positioner has a generally vertical support column and a generally horizontal boom which is pivotally coupled to a top end of the support column. At a second end of the boom, the positioner has an arm member with a rotatable shaft extending therefrom upon which a workpiece may be mounted. The column is preferably mounted on a turntable such that the positioner may be rotated about a longitudinal axis of the column. In use, the positioner can move a workpiece up, down, left, right and to and fro to change the location of the workpiece. The orientation of the workpiece may also be changed by rotating the workpiece about a longitudinal axis of the shaft.

25 Claims, 8 Drawing Sheets

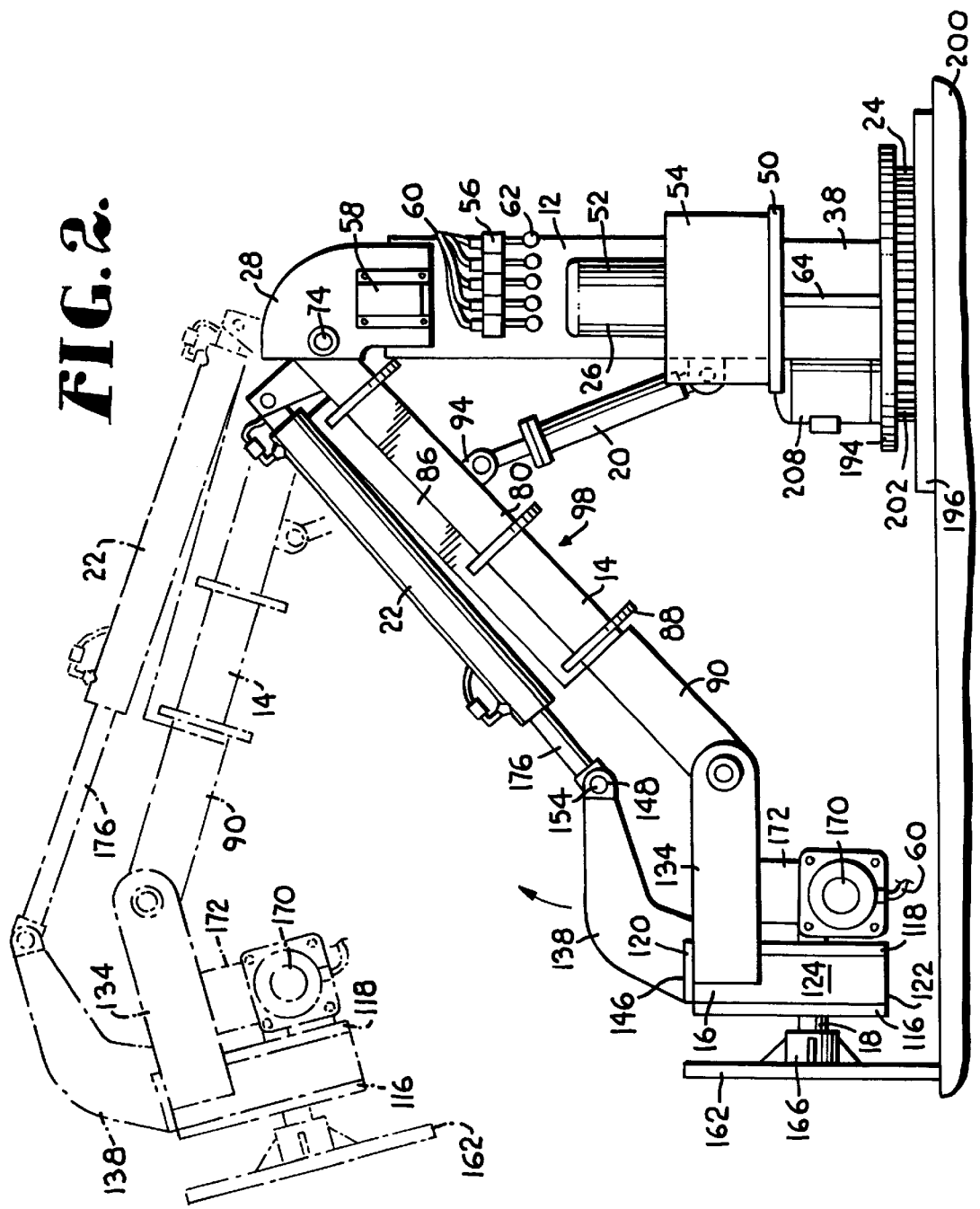

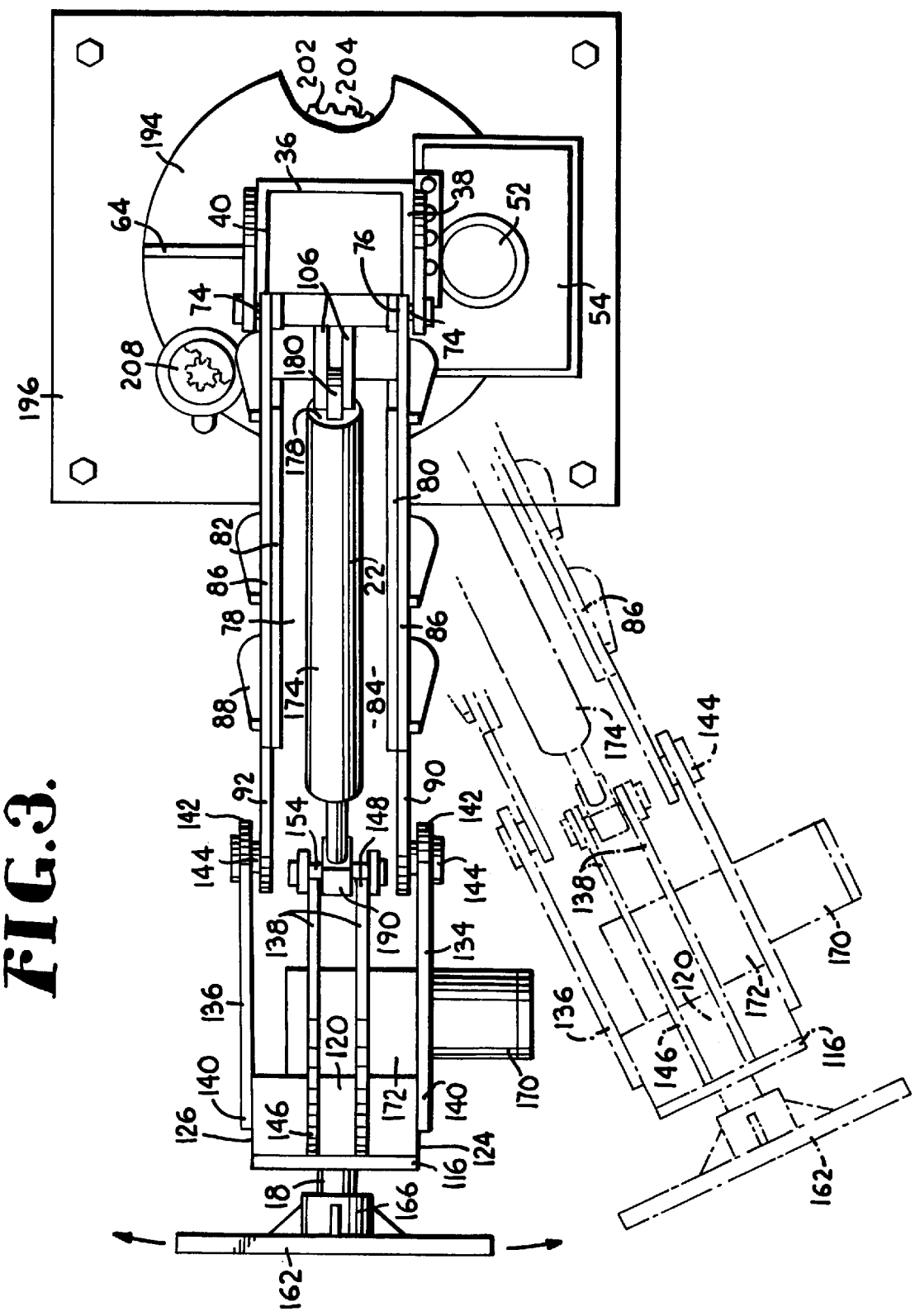

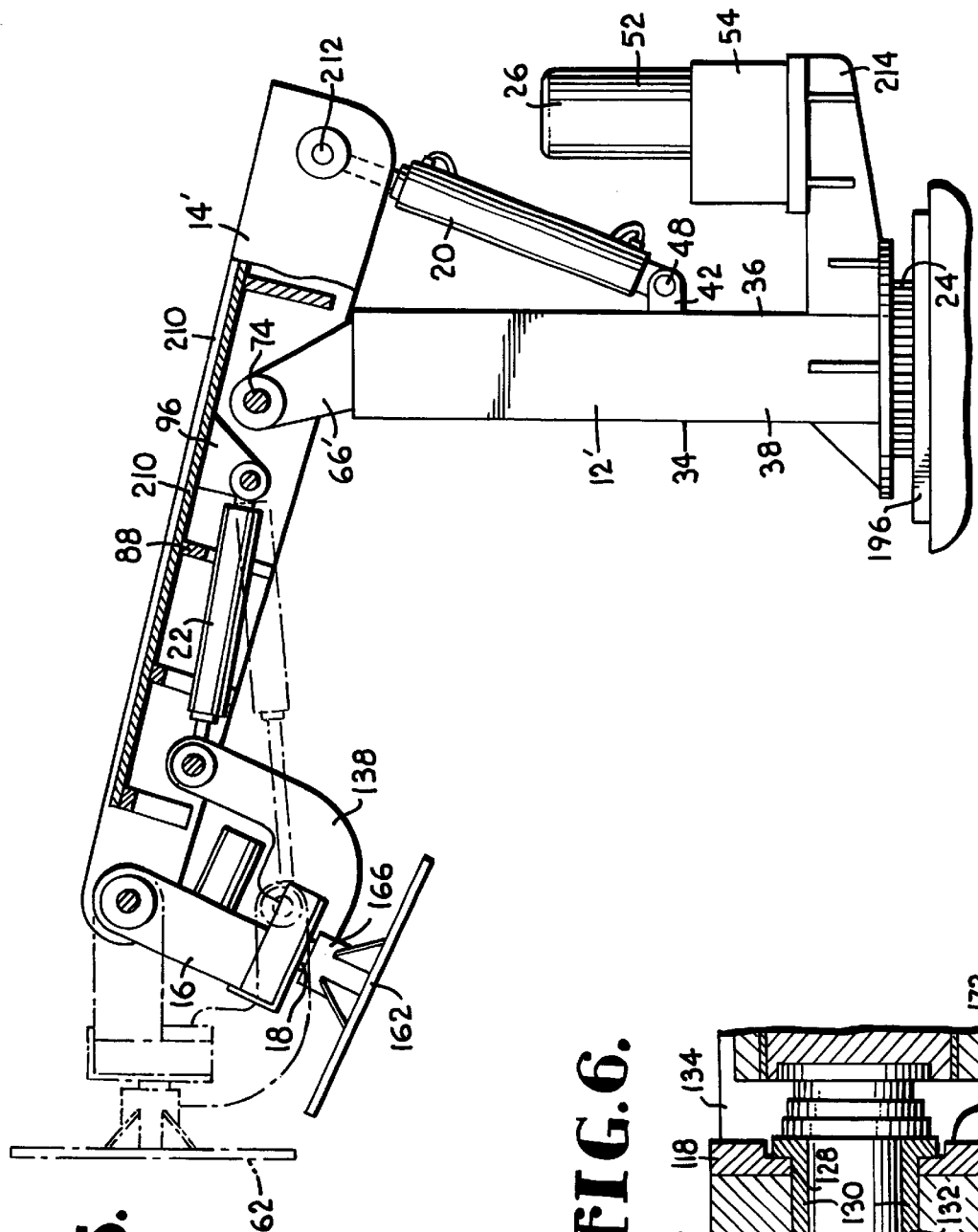
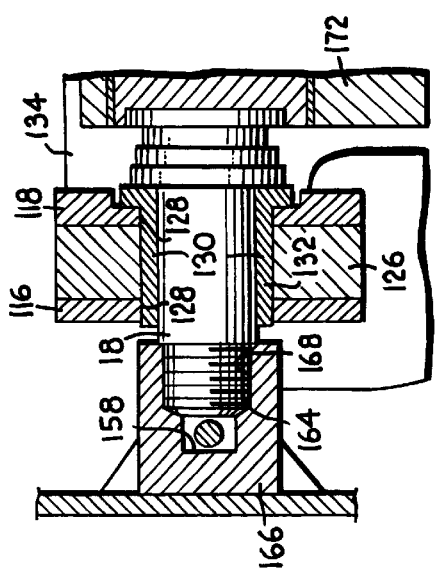

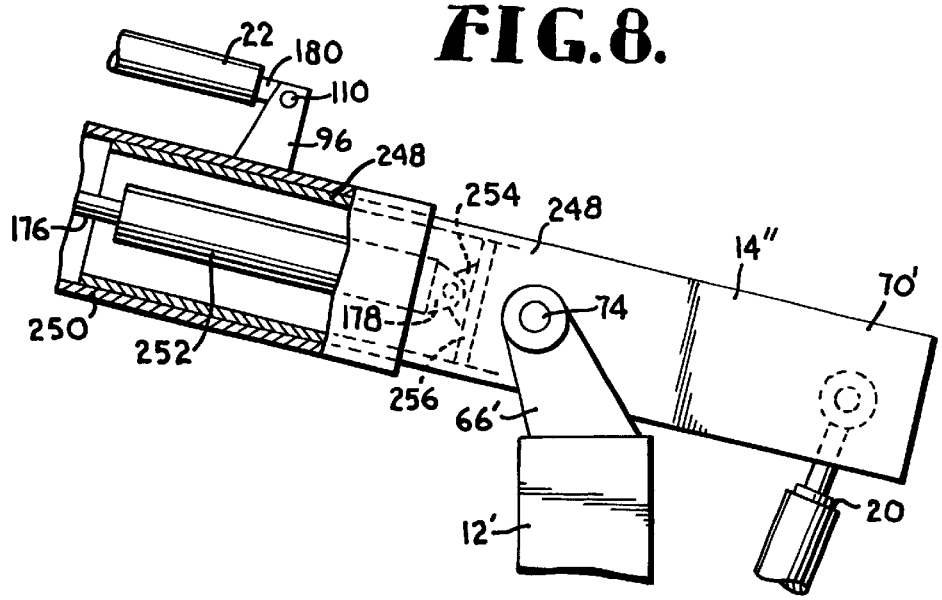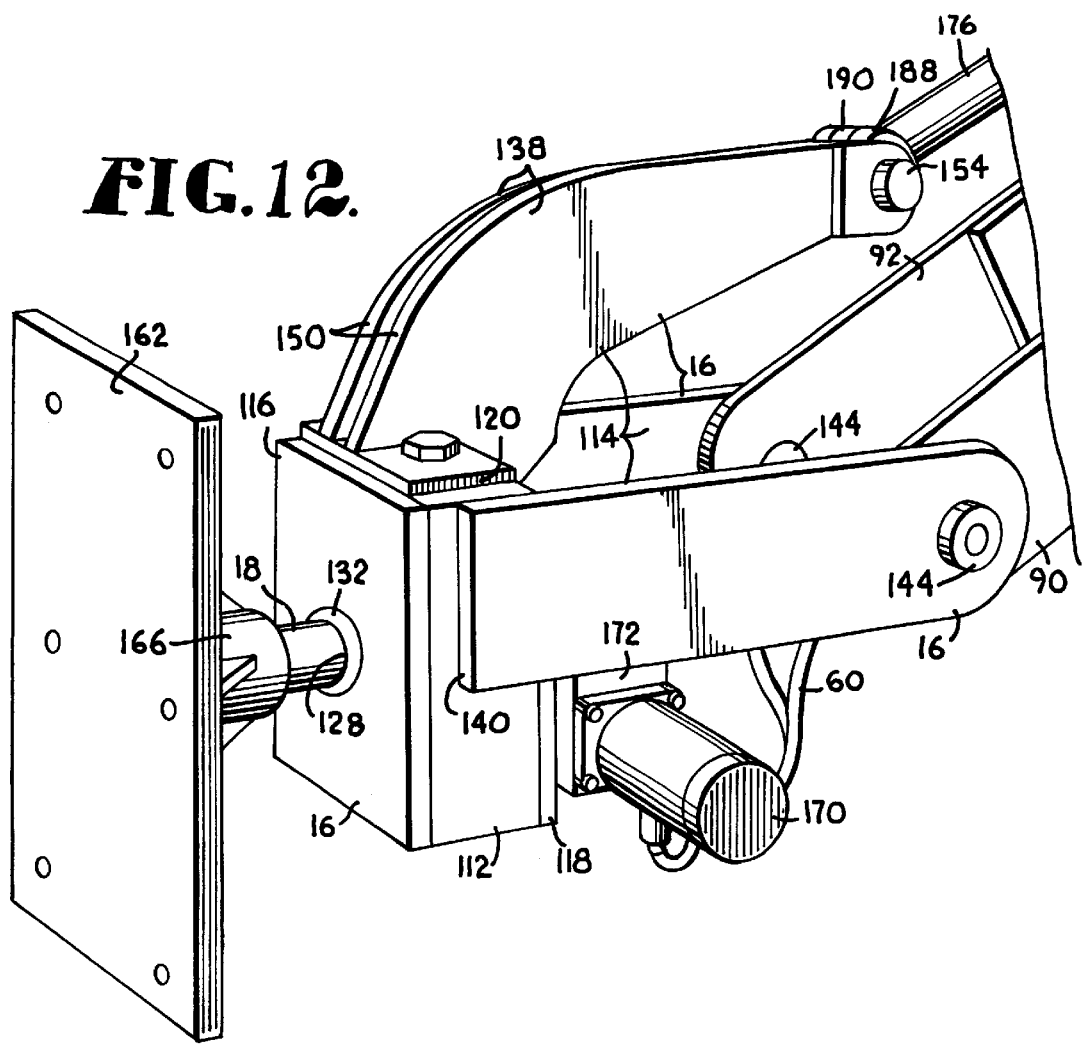

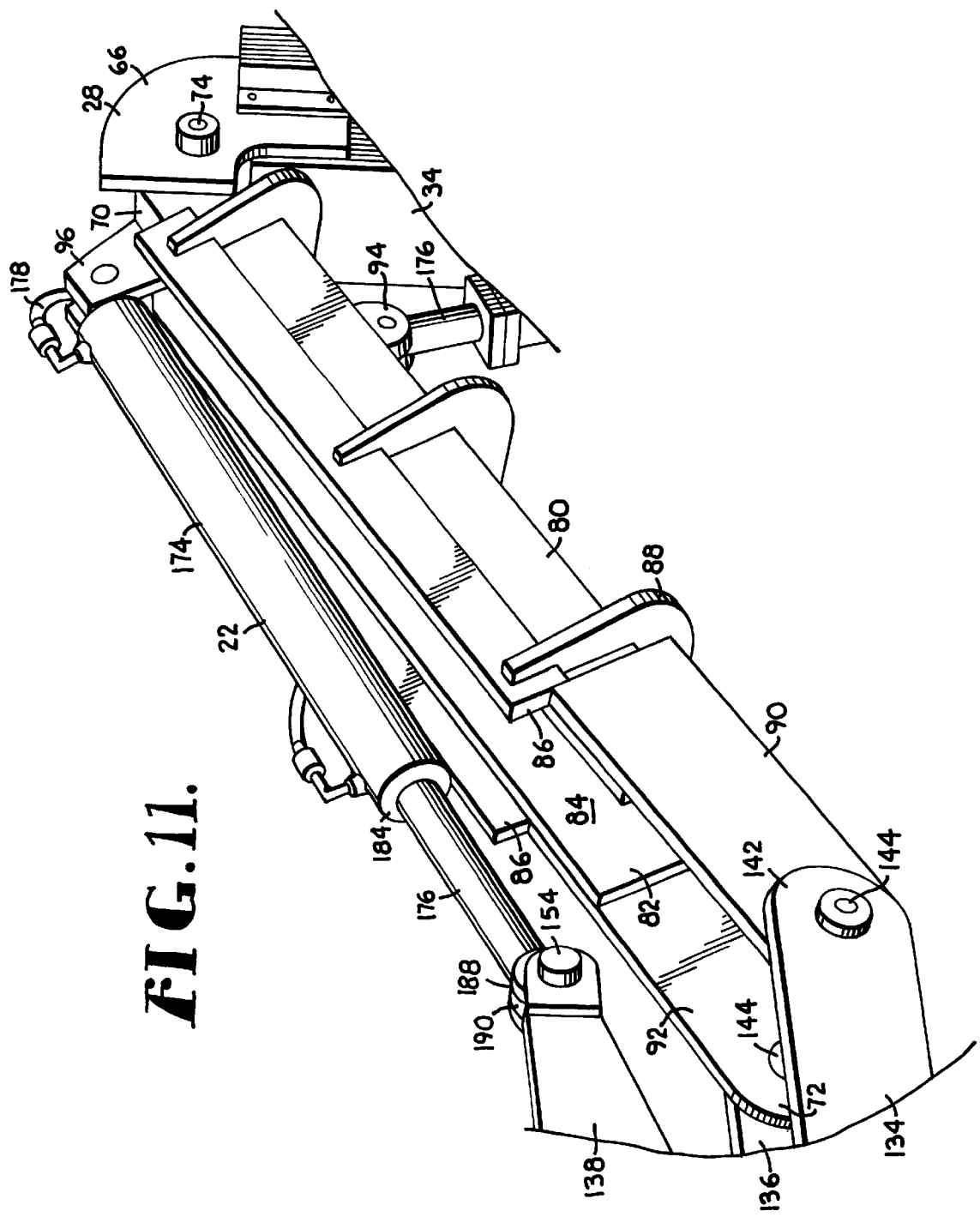

WELDER POSITIONER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to an apparatus for manipulating the position and orientation of a workpiece for welding. More particularly, this invention relates to a welder positioner which allows a user to raise, lower, move side to side and rotate a large piece of metal to a desired location and orientation to assist in the construction and manufacturing of any number of large metal devices, mechanisms or apparatus.

In the manufacturing process, workers are often times required to move large metal pieces which are to be welded together to fabricate the item being manufactured. As a result, numerous devices have been developed for manipulating the location and orientation of these workpieces to assist in the manufacturing process. One such device, and the simplest, is merely a table or platform which can be raised and lowered, thus raising and lowering the workpiece resting on the table. Many of these devices incorporate hydraulic cylinders because of their ability to easily move heavy objects.

Numerous modifications have been made to the simple raising and lowering table design to provide the user with more freedom in changing the orientation of the workpiece. Some of the changes include making the tabletop surface rotatable, thus permitting the user to not only raise and lower the workpiece but to rotate the workpiece in a horizontal manner. Another modification to the raising and lowering platform design is to provide a way for the tabletop to move from a generally horizontal orientation to a vertical orientation, thus providing the user with even more freedom to change the orientation of the workpiece. While these devices certainly present an advance in the art over simply laying items to be joined side by side on the ground, these devices provide only a limited number of movements and hence a limited number of positions in which to orient the workpiece or workpieces.

Therefore, there is a need for a workpiece positioner which can easily and efficiently move large workpieces through a virtually infinite number of locations and orientations, including up, down, left, right, to and fro and clockwise and counterclockwise rotation in any location. The present invention overcomes the drawbacks of the prior art and fills these and other needs.

BRIEF SUMMARY OF THE INVENTION

In order to overcome the above-stated problems and limitations, and to achieve the noted objects, there is provided a welder positioner having a generally vertical and upright support column with a top end, a generally horizontal boom that is pivotally coupled with the top end of the support column, an arm member pivotally coupled to and rotatable about a second end of the boom, and a shaft extending outwardly from the arm member and rotatable 360° about its longitudinal axis upon which a workpiece may be coupled.

In general, a user of the positioner can move a workpiece through a large generally vertical arc by way of a boom cylinder which is coupled with the column in the boom. By extending the length of the boom cylinder, the boom pivots about its connection to the column and the second end of the boom travels through a large and generally vertical arc. Additionally, the user can independently move the workpiece through a smaller generally vertical arc by way of an arm member cylinder which couples the boom with the arm member. By extending the length of the arm member cylinder, the arm member pivots about its connection to the second end of the boom and travels through a smaller generally vertical arc.

Further, a user of the positioner may also move the workpiece through a large and generally horizontal arc by way of the column resting on a large turntable. As a result, the user may rotate the positioner about the longitudinal axis of the generally vertical column. Further still, the user has even more freedom of moving the workpiece by providing a motor coupled with the shaft extending from the arm member. By activating the motor, the user may rotate the workpiece about the longitudinal axis of the shaft to position the workpiece in the desired orientation.

Further objects, features, and advantages of the present invention over the prior art will become apparent from the detailed description of the drawings which follows, when considered with the attached figures.

BRIEF DESCRIPTION OF THE SEVERAL VIEWS OF THE DRAWING

The features of the invention noted above are explained in more detail with reference to the preferred embodiments illustrated in the attached drawing figures, in which like reference numerals denote like elements, and in which:

FIG. 2 is a side elevational view of the positioner of FIG. 1 illustrating a boom movable between a lowered position and a raised position;

FIG. 3 is a top plan view of the positioner of FIG. 1 illustrating the positioner being rotatable via a turntable having a slewing gear and a turntable motor with portions being cut-away for clarity;

FIG. 5 is a side elevational view of a second embodiment of a positioner of the present invention with a portion of the boom cut-away for clarity;

FIG. 6 is a fragmentary partial cross-sectional view of a body of an arm member, a shaft, a jig and a shaft motor;

FIG. 8 is a fragmentary side elevational view of a positioner of the present invention with an extendable boom with a portion thereof cut-away for clarity;

FIG. 11 is a portion of FIG. 1 that illustrates the boom and has been enlarged for clarity; and FIG. 12 is a portion of FIG. 1 that illustrates the arm member and has been enlarged for clarity.

DETAILED DESCRIPTION OF THE INVENTION

Figure 1:
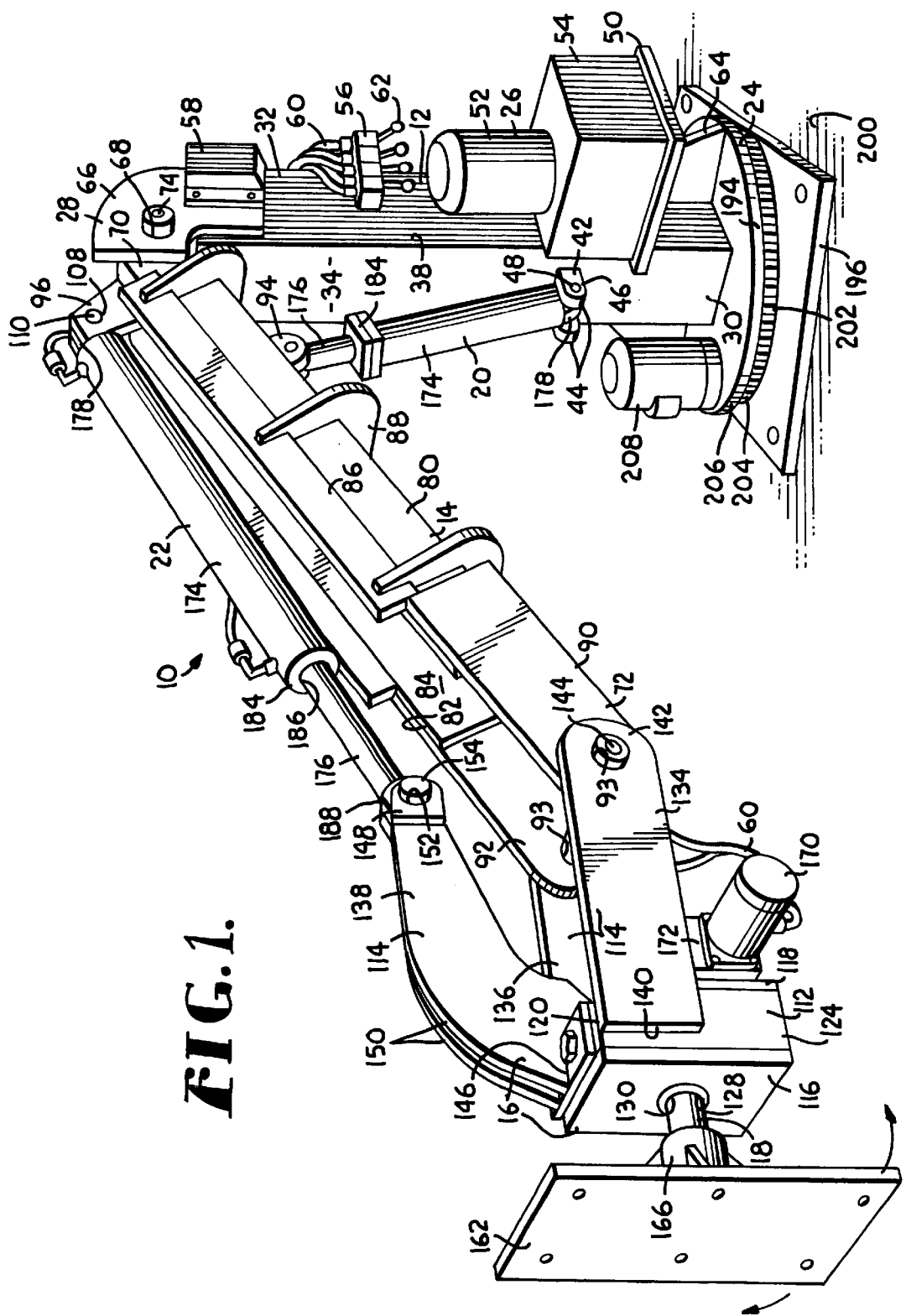
FIG. 1 is a perspective view of a first embodiment of a positioner of the present invention.

Referring initially to FIG. 1, numeral 10 generally designates a first embodiment of an apparatus for positioning workpieces in a desired orientation for welding. The apparatus 10 may also be called a welder positioner 10 and it generally includes a column 12, a boom 14, an arm member 16 and a shaft 18. The positioner preferably also includes a boom cylinder 20, an arm member cylinder 22, a turntable 24 and a hydraulic power unit 26.

Figure 10:
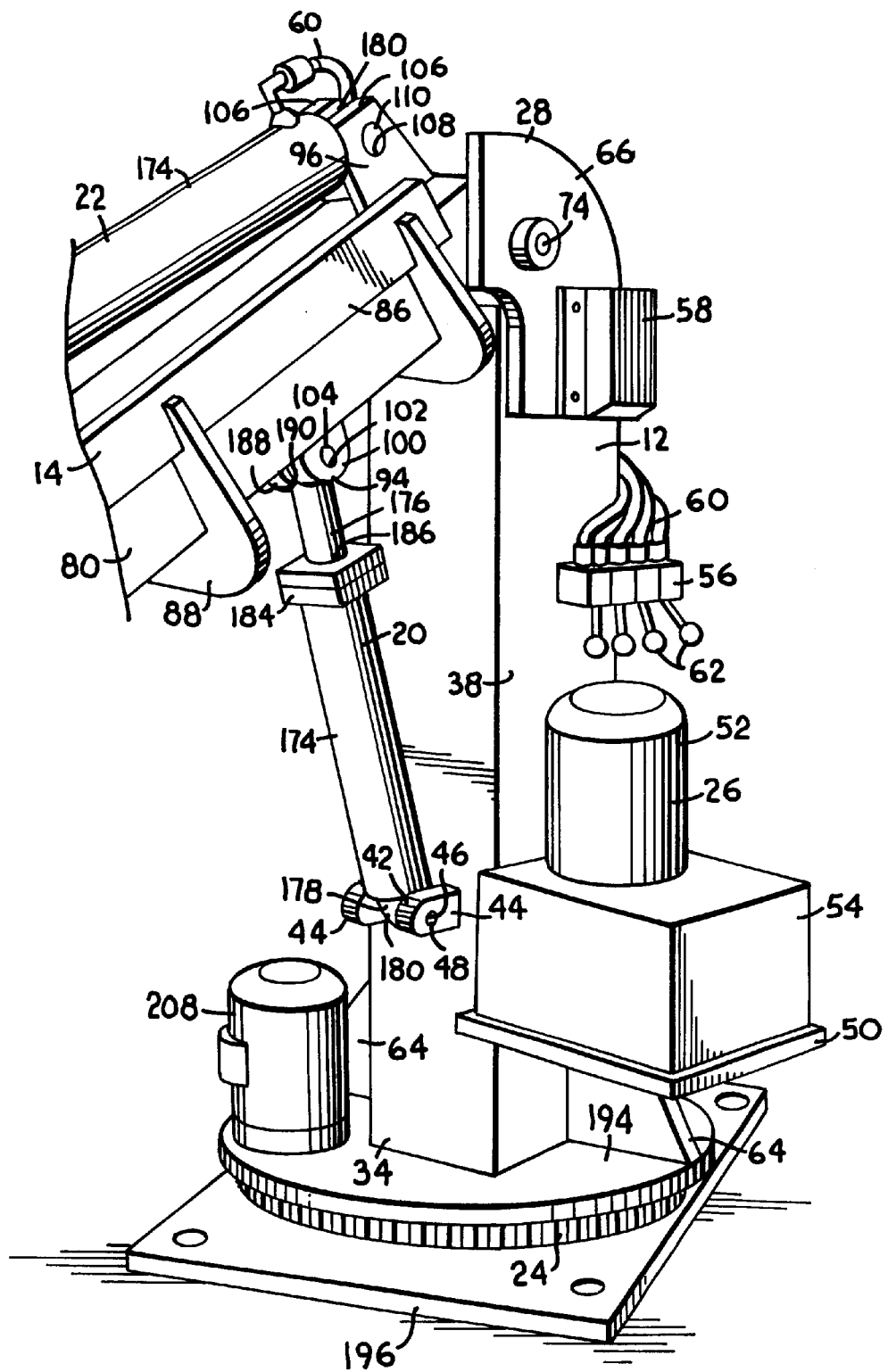
FIG. 10 is a portion of FIG. 1 that illustrates the column and has been enlarged for clarity.

The column 12, as viewed in greater detail in FIG. 10, is preferably an elongate member in a generally vertical orientation and has a top end 28 and a bottom end 30. In the present embodiment, the column 12 includes a post 32 that is essentially a square tube having a front wall 34, a back wall 36 and first and second side walls 38,40. The post 32 is preferably made of steel and the walls 34,36,38,40 of the post are of sufficient thickness to support the loads desired to be positioned. The post 32 includes a cylinder coupler bracket 42 located on the front wall 34 of the post. The cylinder coupler bracket is for coupling the boom cylinder 20 with the column 12 and is preferably a pair of flanges 44 extending outwardly from the post 32. Each of the flanges 44 has a bore 46 therethrough for receiving a pin 48.

As can be seen in FIGS. 1 and 10, the post also includes a shelf 50 extending outwardly from the first sidewall 38 of the post 32. The shelf 50 supports the hydraulic unit 26 which includes an electric motor 52 and a fluid reservoir 54. The electric motor 52 is directly coupled to a hydraulic pump (not pictured) that is contained in the fluid reservoir 54. It should be noted that if a user desired to have a hydraulic power unit external from or separate from the positioner 10, one would not need the bracket. However, in an effort to make the positioner a self-contained unit, the shelf 50 for supporting the hydraulic power unit has been found desirable. Additionally one could remove the shelf by locating the fluid reservoir and hydraulic pump inside the post 32.

Also preferably mounted on the column 12 are a hydraulic manifold 56 and an electrical power supply box 58. The manifold 56 controls the flow of the hydraulic fluid to the various hydraulic components of the positioner. Preferably, the cylinders 20,22 include counterbalance valves or safety check valves wherein the orientation of the workpiece would not change if a hydraulic hose 60 were to leak or rupture. While the manifold has corresponding control levers 62 that have been mounted on the post 32, the control levers 62 could be positioned in a movable control unit located remotely from the column 12, wherein an operator of the positioner could stand, for example, out near the workpiece and still control the operation of the positioner. However, for safety reasons, it has been found beneficial to locate the control levers 62 on the column 12, whereby the operator cannot stand in an area where the workpiece is moving. The electrical power supply box 58 is coupled to an external electrical power source and simply supplies electrical power to the electric motor 52 of the hydraulic power unit 26.

The post 32, at the bottom end 30 of the column 12, includes support brackets 64. The support brackets, as illustrated, are welded to the first and second sidewalls 38, 40 of the post and to the turntable 24 to help maintain the post 32 in a generally vertical and upright position during the operation of the positioner.

The column 12 also includes a pair of upwardly extending plates 66 at its top end 28. The plates are preferably welded to the post 32 and extend upwardly therefrom. Each of the plates 66 contain a bore 68 therethrough for facilitating the pivotal coupling of the boom 14 to the top end 28 of the column 12. While the present embodiment features plates 66 coupled to the sidewalls of the post 32, it is within the scope of the present invention to merely have the sidewalls 38, 40 of the post 32 extend upwardly beyond the front and back walls 34, 36 of the post 32.

The boom 14, as seen in FIGS. 1 and 11, has a first end 70 and a second end 72. The first end of the boom is pivotally coupled with the top end 28 of the column via a pair of pins 74 which pass through bores 76 in the first end 70 of the boom 14 and the bores 68 in the plates 66 of the column 12. The boom is preferably an elongate member with a U-shaped cross-section. The boom has a bottom wall 78 and first and second sidewalls 80, 82. The three walls 78, 80, 82 of the boom 14 define an open area 84 between the sidewalls 80, 82 and above the bottom wall 78. By omitting a top wall from the boom, and having the boom have a U-shaped cross-section, the arm member cylinder 22 may go down between the sidewalls 80,82 and into the open area 84 during use of the positioner 10 when the arm member 22 is rotated such that the shaft 18 points in a generally downward direction. To strengthen the boom 14 and to accommodate for the omission of a top wall, the boom is provided with sister plates 86 and supports 88.

At the second end 72 of the boom 14, the boom includes first and second extension arms 90, 92. The extension arms are for supporting the arm member 16 and have bores 93 therethrough to facilitate the pivotal coupling of the arm member to the boom. While the extension arms 90, 92 are separate pieces which have been welded to the sidewalls 80, 82 of the boom in the present embodiment, as with the plates 66 on column 12, it is within the scope of the present invention to provide the extension arms 90, 92 by simply having the sidewalls 80, 82 of the boom 14 extend beyond the bottom wall 78 of the boom.

The boom also includes a first cylinder coupler bracket 94 and a second cylinder coupler bracket 96. The first cylinder coupler bracket 94 is located on an underneath side 98 of the bottom sidewall 78 of the boom 14 and is for coupling the boom 14 within the boom cylinder 20. As with the cylinder coupler bracket 42 on the column 12, the first cylinder coupler bracket 94 is preferably a pair of outwardly extending flanges 100. The flanges 100 both include a hole 102 therein for receiving a pin 104 to facilitate the pivotal coupling of the boom cylinder 20 with the boom 14. The second cylinder coupler bracket 96 is preferably located at the first end 70 of the boom 15 intermediate the sidewalls 80, 82 of the boom and above the bottom wall 78 of the boom. The second cylinder coupler bracket 96 similarly includes a pair of flanges 106 that extend outwardly from the boom and have bores 108 therethrough for receiving a pin 110 to facilitate the pivotal coupling of the arm member cylinder 22 with the boom.

The arm member 16, as seen in FIGS. 1 and 12, has a body 112 and a plurality of arms 444 extending outwardly there from. The body 112 generally functions as a bearing support 114 and preferably takes on a box-like shape. The body has a front plate 116, a rear plate 118, a top plate 120, a bottom plate 122 and first and second side plates 124, 126. The front and rear plates 116, 118 have bores 128 therethrough which are coaxial and which jointly receive a bearing 130. In the present embodiment, and as best seen in FIG. 6, the bearing 130 is a bushing 132. The bushing 132 is generally tubular in nature and extends between and is received in the front and rear plates 116, 118 of the body 112. It has been found beneficial to have the bushing made of brass. However, the bushing could be made of any material capable of withstanding the forces placed on it when a workpiece is positioned on the shaft 18. Additionally, it is within the scope of the present invention for the bearing 130 to be a first ball bearing assembly received in the front plate 116 and a second ball bearing assembly received in the rear plate 118.

Preferably, the plurality of arms 114 include first and second side arms 134, 136 and a transfer arm 138. The first and second side arms are generally parallel elongate members and, as with several other components of the positioner, may be cut from a large metal plate or sheet of sufficient thickness to support the workpieces being positioned. Each of the side arms 134, 136 has a proximal end 140 which is coupled with one of the side plates 124, 126 of the body 112 of the arm member 16 and a distal end 142 which is pivotally coupled with the second end 72 of the boom 14 at the first and second extension arms 90, 92 via pins 144.

The transfer arm 138 has a proximal end 146 which is attached to the top plate 120 of the body 112 of the arm member and a distal end 148 which is pivotally coupled with the arm member cylinder 22. The transfer arm 138, as can be best seen in FIGS. 1, 3 and 12, preferably includes two plate-like members 150 which are curved or bowed in appearance. Each of said curved plates 150 has a bore 152 therethrough at the distal end 148 of the transfer arm 138 to facilitate the pivotal coupling of the transfer arm 138 with the arm member cylinder 22 via a pin 154. The transfer arm 138 transfers the lateral movement of the arm member 22 into a generally vertical arc path traced out by the body 112 of the arm member 16 and in turn the workpiece.

The shaft 18 has a proximal end 156 (not shown) and a distal end 158. A portion 160 of the shaft 18 is rotatably received in the bearing 130. The shaft is preferably a solid steel bar. The distal end 158 of the shaft 18 is mechanically coupled with a jig 162. The jig 162 in turn is coupled with the workpiece. As seen in FIG. 6, the distal end 158 of the shaft 18 may be externally threaded 164 and a flange 166 on the jig 162 may be internally threaded 168 such that the jig 162 may be threadably coupled with the shaft 18.

The proximal end 156 of the shaft 18 extends outwardly from the rear plate 118 of the body 112 of the arm member 16 and is coupled with a shaft motor 170 inside a gear box 172. The shaft motor 170 is preferably a fluid motor and is powered by the hydraulic power unit 26. Consequently, the shaft motor 170 is connected to the hydraulic power unit 26 via hoses 60.

The boom cylinder 20 and the arm member cylinder 22 are common hydraulic cylinders known in the art. The cylinders each have a housing 174 and a rod 176 which is slidably received in the housing 174. Each of the housings 174 have a proximal end 178 that includes a flange 180 with a bore 182 therethrough to facilitate the pivotal coupling of the cylinder 20,22 with the appropriate cylinder coupler bracket 42, 96, respectively. A distal end 184 of the housing 174 slidably receives a distal end 186 of the rod 176. The rod 176 also has a proximal end 188 with a flattened tongue portion 190 that has a bore 192 therethrough to facilitate the pivotal coupling of the rod 176 of the boom cylinder 20 with the first cylinder coupler bracket 94 on the boom 14 or of the arm member cylinder 22 with the bores 152 in the distal end 148 of the transfer arm 138 of the arm member 16. The cylinders 20, 22 are hydraulicly operated and are therefore connected with the hydraulic power unit 26 via hoses 60.

The turntable 24 has a top plate 194 and a bottom plate 196. The top plate 194 is connected to the bottom end 30 of the column 12 and to a portion of the support brackets 64. The bottom plate 196 may be connected to a base 198 or to a ground or a floor surface 200. The base 198 preferably acts as a large counterbalance to prevent the positioner 10 from tipping over when a large workpiece is lifted. Alternatively, it is possible for a user to omit the base 198 by bolting the bottom plate 196 directly to the floor 200.

The turntable is simply a large bearing which permits the top plate 194 to freely rotate with respect to the bottom plate 196 even when a large load is placed on the top plate 194. The turntable 24 preferably includes a slewing gear 202 which includes a plurality of teeth 204 around a periphery 206 of the turntable 24. The slewing gear 202 works in connection with a turntable motor 208 that permits a user to rotate the positioner 10 about a longitudinal axis of the column 12.

A second embodiment of the positioner of the present invention is illustrated in FIG. 5. Because the positioner of the second embodiment includes many of the same elements, the elements of the second embodiment will be referenced by the numerals given above in connection with the first embodiment. However, in the event an element of the second embodiment is modified from the similar element in the first embodiment, the reference numeral will be followed by a prime mark.

The main difference between the boom 14' of the second embodiment and the boom 14 of the first embodiment is the location at which the boom is pivotally coupled with the top end 28 of the column 12'. Instead of the boom being pivotally coupled to the top end 28 of the column 12' at its first end 70, the boom 14' is pivotally coupled with the top end 28 of the column 12' at a location intermediate the first and second ends 70, 72 of the boom 14'.

In this embodiment, the column 12' acts as a fulcrum upon which the boom 14' pivots. One of the benefits of moving the pivot point between the column 12' and the boom 14' towards the midpoint of the boom is a change in the element that supports the load placed on the boom when a workpiece is lifted. In the first embodiment, as is best illustrated in FIG. 2, when a workpiece is coupled with the positioner and the boom 14 is in the raised position, the pin 104 in the first cylinder coupler bracket 94 acts as the fulcrum and the load and downward force on the boom 14 is transferred through the boom cylinder 20 to the cylinder coupler bracket 42 mounted on the column 12. This arrangement, especially when an extremely heavy workpiece is being positioned, places a large amount of stress on both the boom cylinder 20 and the cylinder coupler bracket 42.

In the second embodiment, however, because the point where the boom attaches to the column is moved inward on the boom 14', the load and downward force placed on the boom 14' is directed through the pins 74 and right down through the column 12'. As a result, the column 12' directly supports the load and a considerable amount of stress is removed from the cylinder coupler bracket 42 and the boom cylinder 20 in the second embodiment.

As can be seen in FIG. 5, the boom 14' has also basically been inverted. As a result, the boom 14' does not have a bottom wall 78 like the boom 14 of the first embodiment but instead has a top wall 210 upon which the second cylinder coupler bracket 96 is mounted. The first cylinder coupler bracket 94 may be either moved to the first end 70 of the boom 14' or may be removed. If the first coupler bracket 94 is removed from the boom 14', the proximal end 188 of the boom cylinder 20 is coupled with the first end 70 of the boom 14' via a pin 212 through the bores 76 in the first end 70 of the boom 14'. Additionally, as a result of the change in the point at which the boom cylinder 20 couples with the boom, the cylinder coupler bracket 42 on the column 12' is located on the back wall 36 of the post 32 instead of on the front wall 34 as in the first embodiment.

Other changes which may be incorporated in the second embodiment include replacing the shelf 50 on the first side wall 38 that supports the hydraulic power unit 26 with a bracket 214 projecting outwardly from the back wall 36 of the column. By incorporating this change, the hydraulic power unit 26 can be further moved out of the way while at the same time functioning as a counterbalance. A still further change in the second embodiment is the position of the plate 66 with respect to the side walls 80, 82 of the boom 14'. In the first embodiment, the first end 70 of the boom 14 was located between the plates 66. In the second embodiment, however, the plates 66 are positioned within the opening defined by the first and second side walls 80, 82 and the top wall 210.

Figure 4:
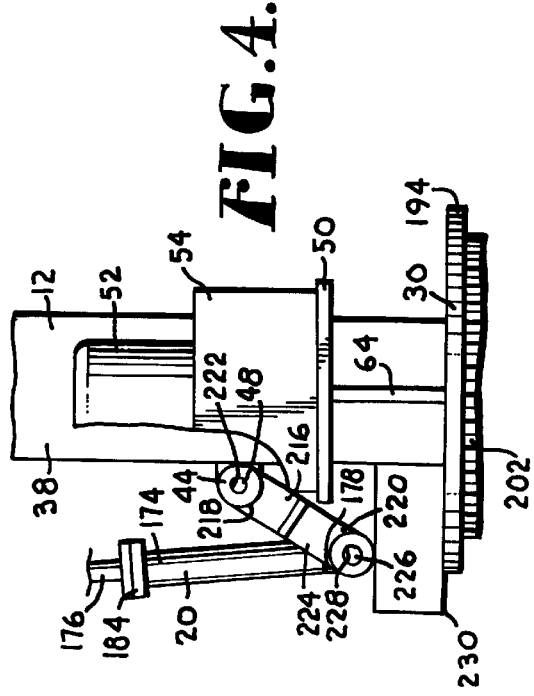
FIG. 4 is a fragmentary side elevational view of a positioner of the present invention incorporating a linkage.

One of the modifications that can be made to the positioner of the present invention is the inclusion of a linkage 216, as illustrated in FIG. 4. The linkage 216 is preferably a Y-shaped bar member having a first end 218 and a second end 220. The first end of the linkage has a bore 222 through which the pin 48 passes when the first end of the linkage is positioned between the pair of flanges 44 of the cylinder coupler bracket 42. The second end 220 of the linkage 216 includes a pair of spaced apart flanges 224 similar to the flanges 44 of the cylinder coupler bracket 42 and between which the flange 180 of the housing of the boom cylinder 20 is positioned. The boom cylinder 20 is then coupled with the second end 220 via a pin 226 that passes through bores 228 in the flanges 224. As seen in FIG. 4, when the linkage 216 is used in the manner illustrated, a block 230 is positioned below the second end of the linkage and supports the linkage and boom cylinder combination during use. By using the linkage 216 in the manner described, a user can change the height through which the second end of the boom travels without having to purchase multiple boom cylinders 20 of varying length.

Figure 9:
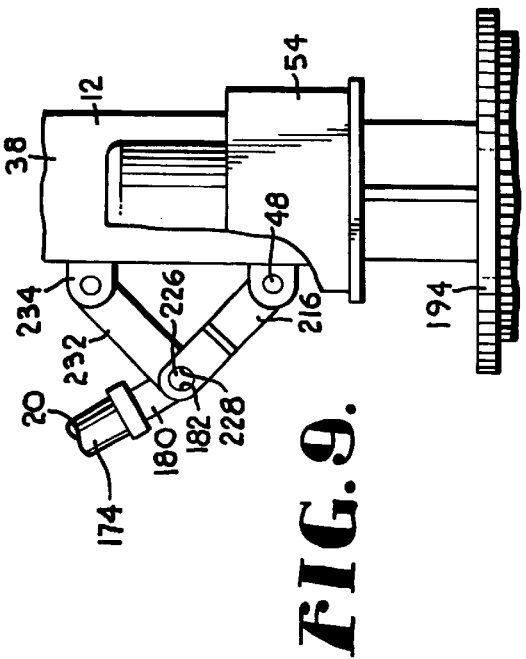
FIG. 9 is a fragmentary side elevational view of a positioner of the present invention incorporating a double linkage.

Another method of varying the height of the path through which the second end of the boom travels is illustrated in FIG. 9. While the method illustrated in FIG. 4 permits the user to lower the path through which the second end of the boom travels during use, FIG. 9 illustrates a method a user may use to raise the path through which the second end of the boom travels when compared to the arrangements of FIGS. 1 and 5 which do not incorporate the use of a linkage. In this method, a second linkage 232 and a second cylinder coupler bracket 234 are added. This arrangement raises the location of the proximal end 178 of the boom cylinder 20 and in turn raises the relative positions of the boom during use.

Figure 7:
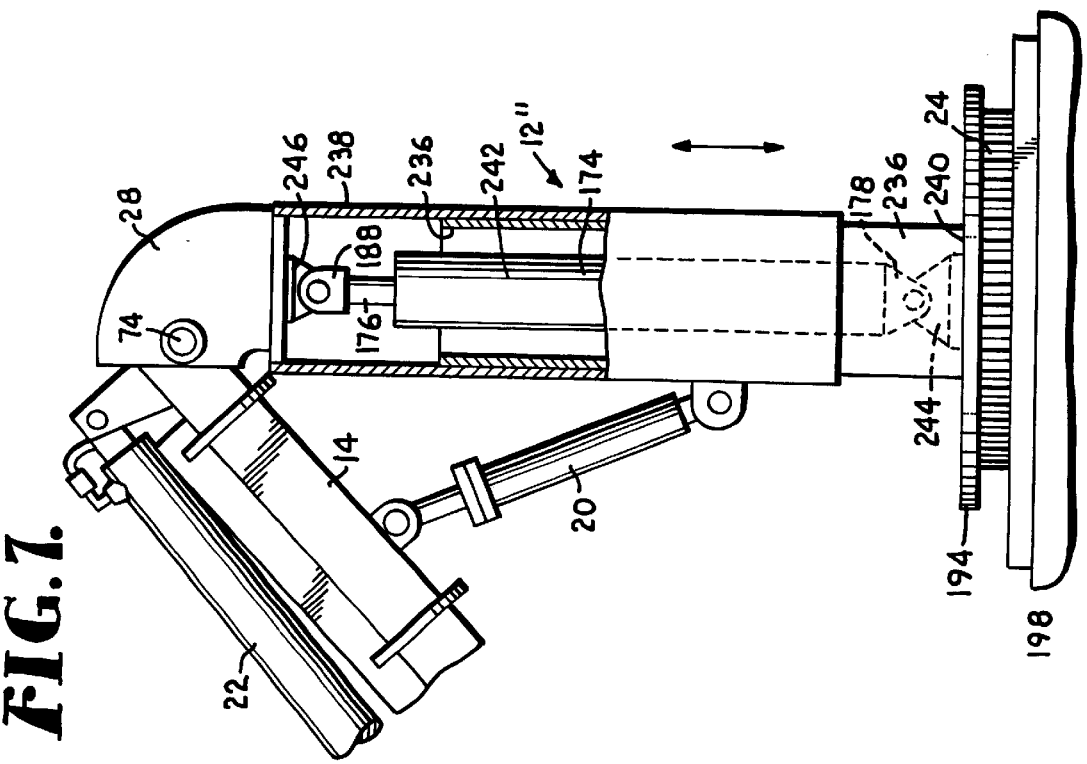
FIG. 7 is a fragmentary side elevational view of a positioner of the present invention with an extendable column with a portion thereof cut-away for clarity.

Other modifications to the positioner that are within the scope of the present invention are illustrated in FIGS. 7 and 8. FIG. 7 illustrates a positioner that has been modified to include a telescoping column 12". The column 12" has an inner piece 236 and an outer piece 238. The inner piece 236 is stationary and is rigidly secured at a bottom end 240 to the top plate 194 of the turntable 24. The outer piece 238 is slidably received on the inner piece in telescoping fashion. The column 12" also includes a column cylinder 242 that is located inside the mating pieces 236,238. Just like the other hydraulic cylinders 20,22, the column cylinder has a housing 174 with a proximal end 178. The proximal end 178 of the housing is coupled to the turntable 24 via a first coupler bracket 244. The column cylinder also has a rod 176 with a proximal end 188. The proximal end of the rod is coupled to the outer piece 238 via a second coupler bracket 246. The boom cylinder may then be used to raise and lower the outer piece with respect to the base 198 and, because the boom 14 and the boom cylinder 20 are coupled with the outer piece, the boom cylinder raises and lowers the relative height of the workpiece.

FIG. 8 illustrates a positioner that has been modified to include a telescoping boom 14". As with the telescoping column 12", the telescoping boom 14" has an inner piece 248 and an outer piece 250. The telescoping boom 14" also has an interior boom cylinder 252. The proximal end 178 of the housing of the interior boom cylinder 252 is coupled to the stationary inner piece 248 via a coupler bracket 254. The coupler bracket 254 can be located on a divider wall 256 in the inner piece. The proximal end 188 (not shown) of the rod 176 is then coupled to the outer piece 250 and the interior boom cylinder can be used to move the workpiece toward and away from the column 12.

In use, a user attaches a workpiece to be positioned to the jig 162 located on the distal end 158 of the shaft 18. By extending and retracting the rod 176 of the boom cylinder 20, the user can move the workpiece through a large and generally vertical arc. By selectively extending and retracting the rod 176 of the arm cylinder 22, the user can also move the workpiece through a smaller generally vertical arc as the arm member pivots around the second end 72 of the boom 14. Additionally, the user may rotate the workpiece 360°, both clockwise and counterclockwise, about the longitudinal axis of the shaft 18. Further still, by rotating the column 12 about its own generally vertical axis via the turntable 24, the user can move the workpiece through a large generally horizontal arc. Even further, if the positioner incorporates the extendable column and/or the extendable boom illustrated in FIGS. 7 and 8, respectively, the user may move the workpiece up and down and/or in and out, respectively.

As can be seen, the positioner 10 is uniquely adapted to permit a user to move a workpiece through an infinite number of orientations to facilitate the welding or otherwise working on the workpiece in a safe manner. Additionally, because of the ease at which a user can change the orientation of the workpiece, the positioner makes the performing of common tasks in the manufacturing process more ergonomical as the user can move the workpiece to the proper height and orientation.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. An apparatus for positioning a workpiece in a desired orientation for welding, the apparatus comprising:
    a turntable having a top plate and a bottom plate;
    a support column having a top end and a bottom end, the bottom end of the column being connected to the top plate of the turntable;

a boom having a first end and a second end, the boom being pivotally connected to the top end of the column;

an arm member having a proximal end and a distal end, the proximal end of the arm member being pivotally connected to the second end of the boom;

a boom cylinder coupling the column to the boom, whereby the boom cylinder pivots the boom about the column;

an arm member cylinder coupling the boom to the arm member, whereby the arm member cylinder pivots the arm member about the boom; and a support shaft having a proximal end and a distal end, the shaft being coupled with the arm member adjacent the proximal end of the shaft and the distal end of the shaft being capable of receiving the workpiece.

2. The apparatus of claim 1, wherein the arm member includes a body and a bearing, the bearing rotatably receiving a portion of the shaft and the body receiving the bearing.

3. The apparatus of claim 2, wherein the body includes a front plate, a rear plate, a top plate, a bottom plate, and first and second side plates, the front and rear plates having bores there through, the bores receiving the bearing.

4. The apparatus of claim 2, further comprising a shaft motor coupled with the proximal end of the shaft and wherein the shaft motor may rotate the shaft.

5. The apparatus of claim 4, wherein the shaft motor includes a fluid motor.

6. The apparatus of claim 5, wherein the shaft motor includes a gearbox with worm gears therein and whereby the fluid motor rotates the shaft via the worm gears.

7. The apparatus of claim 1, further comprising a turntable motor coupled with the turntable and wherein the turntable includes a slewing gear, the turntable motor being coupled with the slewing gear wherein activation of the turntable motor rotates the column with respect to the bottom plate.

8. The apparatus of claim 1, further including a counter weight and wherein the bottom plate is mounted to the counter weight.

9. The apparatus of claim 1, wherein the arm member includes first and second generally parallel elongate members, each of said members having a first end and a second end, and wherein the proximal end of the arm member is pivotally connected with the second end of the boom at each of said first ends of said elongate members.

10. The apparatus of claim 1, wherein the arm member includes a transfer arm having a proximal end and a distal end, and wherein the arm member cylinder is coupled to the arm member at the distal end of the transfer arm.

11. The apparatus of claim 1, wherein the boom is pivotally connected to the top end of the column at the first end of the boom.

12. The apparatus of claim 1, wherein the boom is pivotally connected to the top end of the column at a location intermediate the first and second ends of the boom.

13. The apparatus of claim 12, wherein the boom cylinder is coupled with the column on a side of the column opposite the arm member.

14. The apparatus of claim 1, further including a workpiece mounting fixture and wherein the distal end of the shaft is mechanically coupled with the workpiece mounting fixture.

15. The apparatus of claim 1, wherein the column has a telescoping portion whereby the distance between the top end and the bottom end of the column is adjustable.

16. The apparatus of claim 1, wherein the boom has a telescoping portion whereby the distance between the first end and the second end of the boom is adjustable.

17. An apparatus for manipulating the orientation of a workpiece comprising:

a generally upright column having a top end and a bottom end;

a boom having a first end, a second end, a top side and a bottom side, the first end being pivotally connected to the top end of the column;

an arm member having a body with a plurality of arms extending therefrom, a proximal end and a distal end, the proximal end of the arm member being pivotally connected to the second end of the boom;

a boom cylinder coupling the column to the boom, wherein the boom cylinder is coupled with the column on a side of the column adjacent the arm member and whereby the boom cylinder pivots the boom about the top end of the column;

an arm member cylinder coupling the boom to the arm member, whereby the arm member cylinder pivots the arm member about the second end of the boom;

a hydraulic power unit coupled with the cylinders for supplying power thereto;

a support shaft having a proximal end and a distal end, the shaft being coupled with the arm member adjacent the proximal end of the shaft; and a workpiece mounting fixture coupled with the distal end of the shaft and being capable of receiving the workpiece.

18. The apparatus of claim 17, wherein the arm member further includes a bearing supported by the body and wherein the body is generally box shaped and has a front plate, a rear plate, a top plate, a bottom plate, and first and second side plates, the front and rear plates have bores there through and wherein the bearing is received in the bores.

19. The apparatus of claim 17, wherein the plurality of arms include first and second side arms, each of which have proximal ends which are connected to the body and distal ends, and wherein the proximal end of the arm member is pivotally connected to the second end of the boom at the distal ends of the side arms.

20. The apparatus of claim 17, wherein the arm member cylinder is located above the top side of the boom and the plurality of arms include a transfer arm having a distal end and a proximal end, the distal end of the transfer arm being pivotally connected to the arm member cylinder and the proximal end being connected to the body of the arm member.

21. An apparatus for manipulating the orientation of a workpiece comprising:

a generally upright column having a top end and a bottom end;

a boom having a first end, a second end, a top side and a bottom side, the boom being pivotally connected to the top end of the column adjacent the first end of the boom;

an arm member having a proximal end and a distal end, the proximal end of the arm member being pivotally connected to the second end of the boom;

a boom cylinder coupling the column to the boom, wherein the boom cylinder is coupled with the column on a side of the column opposite the arm member and whereby the boom cylinder pivots the boom about the top end of the column;

an arm member cylinder coupling the boom to the arm member, whereby the arm member cylinder pivots the arm member about the second end of the boom;

a hydraulic power unit coupled with the cylinders for supplying power thereto;

a support shaft having a proximal end and a distal end, the shaft being coupled with the arm member adjacent the proximal end of the shaft; and a workpiece mounting fixture coupled with the distal end of the shaft and being capable of receiving the workpiece.

22. The apparatus of claim 21, wherein the arm member has a body with a plurality of arms extending therefrom.

23. The apparatus of claim 22, wherein the arm member further includes a bearing supported by the body, wherein the body is generally box shaped and has a front plate, a rear plate, a top plate, a bottom plate, and first and second side plates, and wherein the front and rear plates have bores there through and the bearing is received in the bores.

24. The apparatus of claim 23, wherein the plurality of arms include first and second side arms, each of which have proximal ends which are connected to the body and distal ends, and wherein the proximal end of the arm member is pivotally connected to the second end of the boom at the distal ends of the side arms.

25. The apparatus of claim 24, wherein the arm member cylinder is located below the bottom side of the boom and the plurality of arms further include a transfer arm having a distal end and a proximal end, the distal end of the transfer arm being pivotally connected to the arm member cylinder and the proximal end being connected to the bottom plate of the body of the arm member.

* * * * *